(12) United States Patent
Breda

(10) Patent No.: US 6,325,089 B1
(45) Date of Patent: Dec. 4, 2001

(54) DIAPHRAGM PRESSURE BALANCING VALVE

(75) Inventor: Silvano Breda, 125 Limstone Crescent, Downsview, Ontario (CA), M3J 2R1

(73) Assignee: Silvano Breda, Downsview (CA)

( * ) Notice: Subject to any disclaimer, the term of this patent is extended or adjusted under 35 U.S.C. 154(b) by 0 days.

(21) Appl. No.: 09/435,902

(22) Filed: Nov. 8, 1999

(51) Int. Cl.<sup>7</sup> .................................................. G05D 11/03
(52) U.S. Cl. ........................................ 137/98; 137/625.41
(58) Field of Search ....................... 137/98, 100, 625.17, 137/625.4, 625.41

(56) References Cited

U.S. PATENT DOCUMENTS 4,022,242 * 5/1977 Turecek ............................. 137/100 X
5,067,513 * 11/1991 Nicklas et al. .......................... 137/98
5,425,394 * 6/1995 Clare .................................. 137/100 X

* cited by examiner

Primary Examiner—Stephen M. Hepperle
(74) Attorney, Agent, or Firm—Neil H. Hughes; Ivor M. Hughes; Marcelo K. Sarkis

(57) ABSTRACT

This valve uses a rotatable balancing chamber to control the waterflow into the balancing chamber. A pair of exit ports on the rotatable balancing chamber are in communication with the balancing chambers on either side of a diaphragm equipped shuttle to control the outlet mixture of hot and cold water. The diaphragm equipped shuttle responds to changes in pressure in the respective balance chambers to throttle the water through the valve in response to changes in inlet pressures. The pressure balancing chambers are isolated from the water supplies feeding the valve when the valve is in the "off" position, and the pressure balancing chambers are pre-pressurized before any water is permitted to exit from the valve.

5 Claims, 7 Drawing Sheets

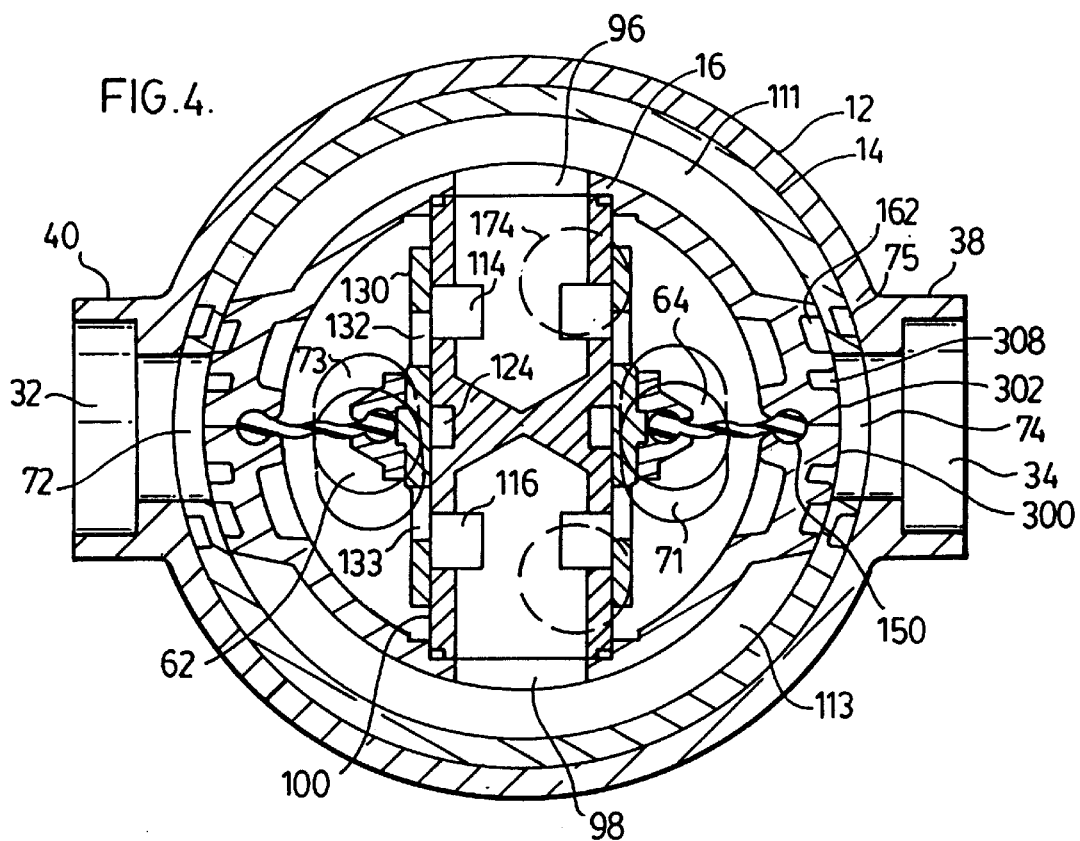
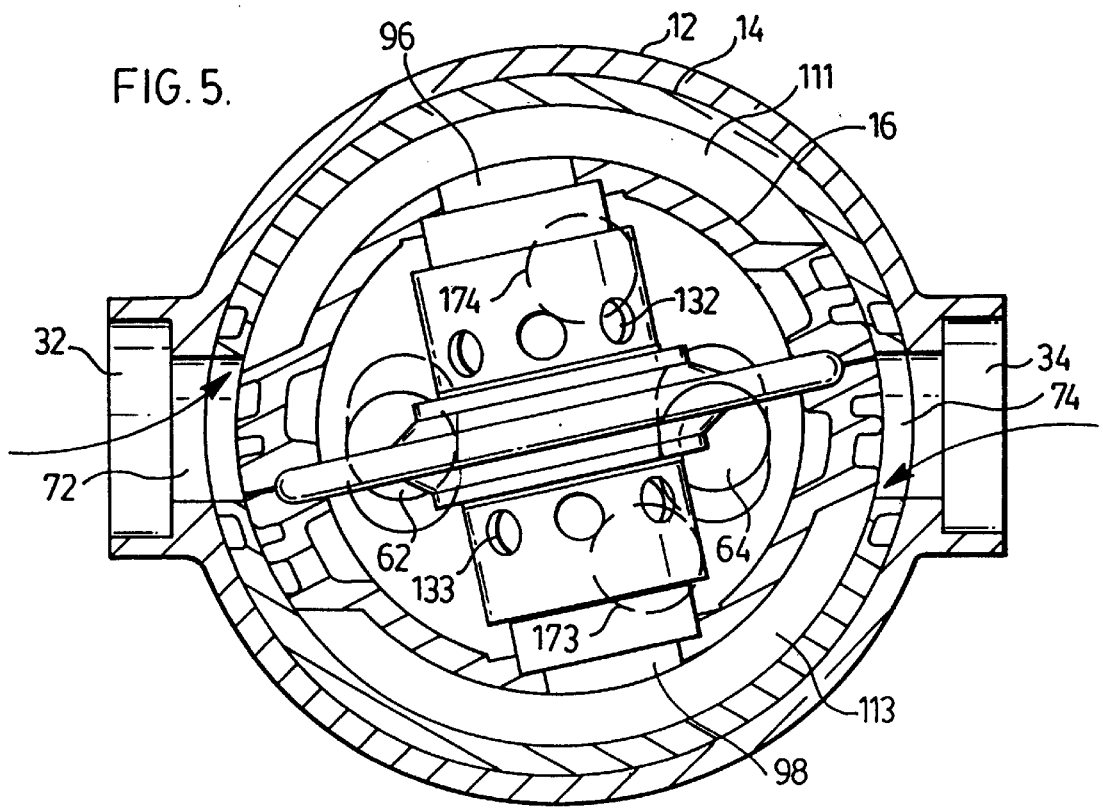

DIAPHRAGM PRESSURE BALANCING VALVE

FIELD OF THE INVENTION

The present invention relates to a single handle mixing valve for tub spouts and shower heads and more particularly to pressure balanced, volume and temperature controlled mixing valves.

BACKGROUND OF THE INVENTION

Consumer demand has been responsible for the single handle mixing valve for tub and shower installations becoming common in the marketplace. With the passage of time, the single handle mixing valve has undergone design changes to permit large volumetric flows of water through the valve (especially in hotel and other commercial establishments such as gymnasiums, apartments and condominiums) with the end result being that some form of pressure balancing between the hot and cold water supplies feeding the mixing valves has become essential. Without the incorporation of a suitable pressure balancing mechanism in the mixing valves, the operation of such high pressure, high flow volume valves in hotels and gymnasiums could lead to serious injury to the user in the event of a sudden pressure change in the hot or cold water supply to the mixing valve.

Most governing codes require that any tub or shower mixing valve include some kind of a pressure balancing mechanism which is capable of responding to abrupt changes in pressure of the hot and cold water supplies within a very short time to restore the balance of the output flows of hot and cold water to the same proportion as they were before the pressure fluctuation occurred.

Because such mixing valves must fit into a confined space, compromises must be made between performance of the valve and the space required for valve in the plumbing installation. Most prior art valves use a spool type poppet valve mechanism to provide a pressure balance in the hot and cold water supplies feeding the valve. Some of the prior art pressure balancing mechanisms are sufficiently complex as to require the services of sophisticated service personnel to overhaul, dismantle or repair such prior art valves.

It will be immediately apparent that a single handle mixing cartridge valve of a compact size which is capable of controlling large flows of hot and cold water in an inverse manner according to pressure fluctuations in the inlet supplies is a most desirable item for the plumbing industry. If the above valve could comprise a housing containing a single cartridge that was easily removed for repair or replacement by untrained service personnel, the valve is all the more desirable.

SUMMARY OF THE INVENTION

This invention is directed to a single handle pressure balancing mixing valve which has a rotatable cartridge incorporating a pressure balancing mechanism within its casing. The cartridge is attached to an actuating stem to which a handle is attached. The cartridge is accessible and removable from the stem end of the valve mechanism by the simple removal of a single C spring wire clip.

In contrast to prior art balancing mechanisms which typically utilize some type of spool type poppet mechanisms to provide the necessary inverse pressure balancing operation, the balancing mechanism of this invention utilizes a sliding sleeve type device, actuated by a surrounding diaphragm to provide the balancing operation.

By providing a rotatable cartridge in the valve of this invention, both the ingress and egress of water to and from the mixing valve may be suitably controlled.

The use of a diaphragm, in association with the sleeve type balancing mechanism slidably mounted on a stationary tube in the rotatable cartridge, assures a smooth immediate response to small fluctuations in supply pressure during operation of the valve. At the same time, the presence of the diaphragm on the balancing mechanism of this pressure balancing valve makes that mechanism less prone to "sticking" due to the accumulation of scale and sludge on the balancing sleeve or on the stationary tube on which the balance sleeve slides than the prior art poppet valve mechanisms. Prior art poppet type spool mechanisms have a tendency to be objectionably noisy when operating in high pressure feed water situations and alternatively the prior art mechanisms have a tendency to "stick" in low pressure feedwater situations partially because of the many O rings used on the spool shuttle which are required to seal the various pressure chambers. The presence of foreign material carried in the water supply and the scale buildup deposited on valve parts by minerals contained in the water tend to build upon the prior art shuttle mechanism over the working life of the valve tend to amplify the "sticking" problem.

This valve tends to minimize the above problem by the installation of screens within the valve structure which remove foreign material before it may cause malfunction in the valve operation.

The valve of this invention effectively isolates the pressure balancing chamber from the feed water supply when the valve is in the "off" position. Turning the valve "on" precharges the various water passages in the cartridge before any water is allowed to flow through the pressure balancing chambers of the valve.

Another aspect of this invention is the inclusion of an adjustable stop mechanism to adjust and limit the rotational travel of the rotatable cartridge so that the flow of the hot water leaving the hot water port (before entering the mixing chamber of the valve) may be restricted to a preset flow rate by adjusting the position of the hot water stop of the valve. This adjustment maybe conveniently carried out from a point outside the valve housing even after the valve is permanently installed and water is flowing in the valve.

It is an object of this invention to provide a single handle pressure balancing mixing valve wherein the pressure balancing mechanism is more sensitive to fluctuations in input water pressure than prior art valves. The pressure balancing mechanism of applicant's valve continues to function even in the presence of lower inlet water pressure on both hot and cold water supplies than the prior art poppet type spool valves.

It is an object of this invention to supply a single handle pressure balancing mixing valve which utilizes comparatively large water passageways and is essentially silent in operation and not prone to producing water hammer.

It is an object of this invention to provide a single handle pressure balancing valve which may be swiftly dismantled and rebuilt without the removal of screws or other complicated fastening devices requiring special tools and skills.

It is a further object of this invention to provide a pressure balancing assembly which will be relatively insensitive to physical orientation. Thus while other prior art valves specify that the valve must be mounted in a physical orientation where the pressure balancing device (piston in a sleeve) must be horizontal, this valve will function acceptably well in any orientation.

Because of this valve's construction, there is no cross-connecting flow possible between the hot and cold inlet ports when the valve is in the off position. Most prior art valves require check-valves at each inlet ports to prevent cross flow between these ports.

It is a further object of this invention to provide a single handle control pressure balancing valve which simultaneously controls both the ingress and egress of water into and out of the valve. Because of this feature, the user is provided with a single control valve having excellent water temperature and volume selectivity whilst retaining all the benefits of a superior pressure balancing operation.

The main water seal for the cartridge of the pressure balancing valve surrounds the cartridge and is an integral part of the cartridge.

Because the cartridge is rotated by the user during use of this valve, the main water seal sweeps past the inlet water ports during the water temperature selection process, exposing different areas of the main water seal to the hot and cold water inlet port streams; it is well known to those skilled in the art that the water seals in prior art valves tend to perish due to the constant impingement of the hot water inlet stream upon the (hot water) seals.

It is another object of this invention to provide a single handle mixing cartridge valve having a sliding seal as the main water seal which utilizes a reversible cartridge for back to back or deck mounted installation.

RELEVANT PRIOR ART

U.S. Pat. No. 5,501,244 Issued Mar. 26, 1996

This is a single handle pressure balancing mixing valve which uses a diaphragm actuated poppet valve to accomplish the balancing function. The two balancing chambers on opposed sides of the diaphragm are pressurized at all times, thus the requirement for check valves at the inlets of the valve. Water leaves the balancing chambers by moving toward the handle so that the valve stem is subjected to the outlet water pressure during operation of the valve. As the valve ages and wears, it is possible that water may leak at the valve stem. The throughflow through the valve tends to be somewhat throttled by partial flow restriction provided by the poppet mechanism.

U.S. Pat. No. 5,441,076 Issued Aug. 15, 1995

This is a single handle pressure balancing mixing valve utilizing a stationary cartridge in which a sleeve type valve shuttles back and forth driven partially by a diaphragm in response to fluctuations in input pressures. Because of the small area allowed for water passage in the throttle area, the valve is limited to applications where a relatively low throughput is acceptable.

The output flow of water from the pressure balancing chambers is toward the valve stem and this valve may be prone to leakage at the valve stem as the various valve components are subjected to wear and scale build up. This valve also requires the presence of check valves to prevent cross-flow at the inlets.

U.S. Pat. No. 5,355,906 Issued Oct. 18, 1994

This single handle pressure balancing mixing valve uses a spool type poppet valve to achieve pressure balance control. Water flow in the valve is from the end of the valve remote from the stem toward the stem. Because the pressurized exit chamber of the valve is at the valve stem, leaking at the stem end of the valve may occur as the mechanism is subjected to wear and scale build up.

Flow rate through the poppet mechanism is somewhat restricted because of the construction of the piston and its surrounding chamber. The piston may have a sticking problem when utilized in low water supply pressures are encountered; scale build up may be a problem.

This valve also has an adjustable stop mechanism to limit the flow of hot water which may pass through the valve into the mixing chamber so that the maximum temperature of the water delivered by the valve may be preset to an acceptable temperature level.

BRIEF DESCRIPTION OF THE DRAWINGS

FIG. 4 is a cross sectional view of the valve of this invention shown in the OFF or CLOSED position.

FIG. 5 is a cross sectional view of the valve of this invention shown with the cartridge rotated through a small angle (approximately 15°) from the position shown in FIG. 4.

Figure 1:
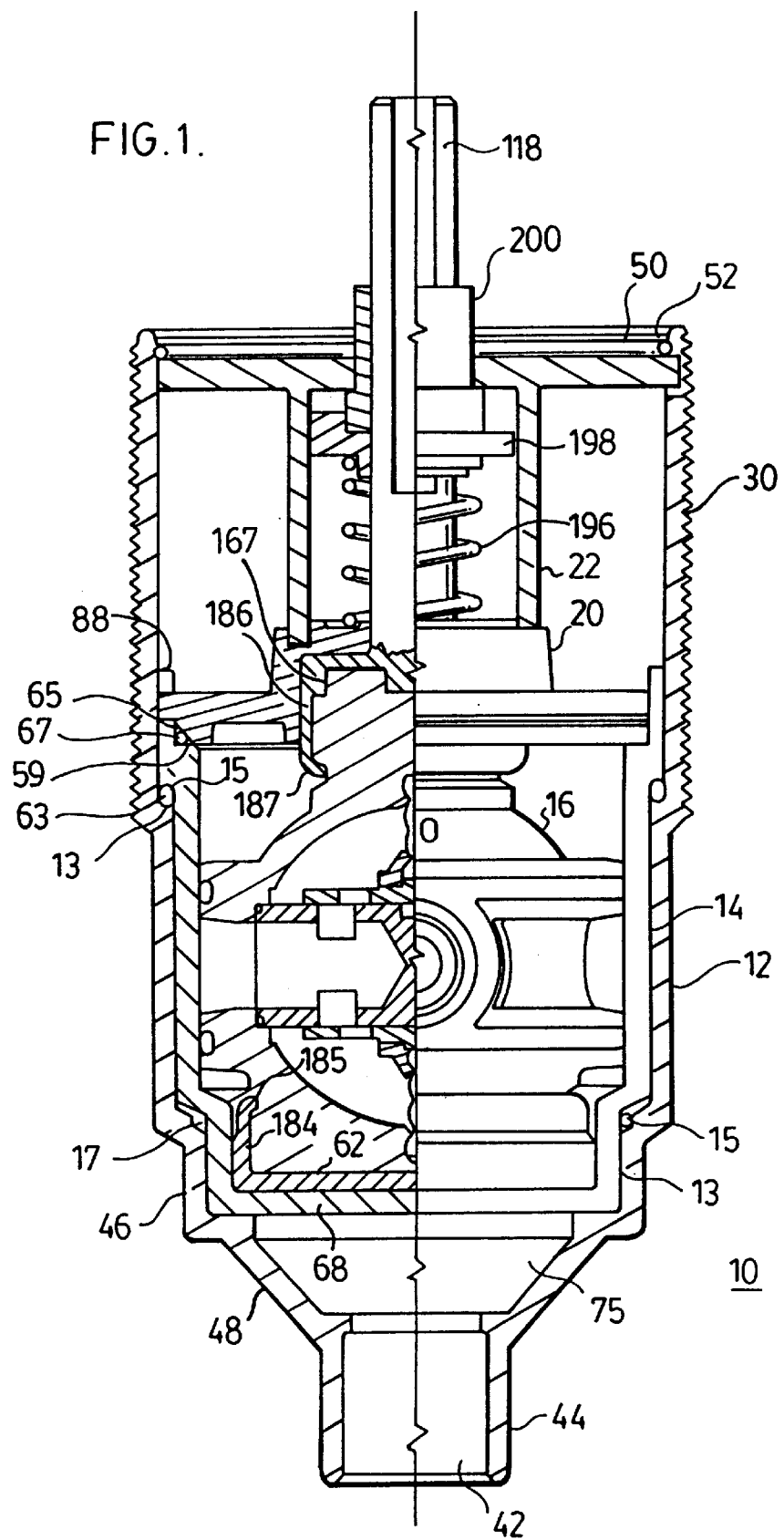
FIG. 1 is a partial sectional view of the single handle pressure balancing mixing valve of this invention.

Referring now to the drawings and FIG. 1 in particular, a pressure balancing mixing valve 10 of the single handle type is shown in a partial sectional view. The primary components of the is valve 10 are: housing 12; lower insert 14; rotatable cartridge 16; spindle-cup assembly 18; sleeve cap 20; and upper insert 22. These will be described in greater detail as the description ensues.

Valve 10 is shown in FIG. 1 having a generally cylindrical shape which is shown in a vertical configuration for convenience of illustration, but it will usually be found that the valve 10 of this invention will be installed having its cylindrical axis in a horizontal plane.

Valve 10 comprises a housing 12, which houses the internal components such as the upper and lower inserts, the rotatable pressure balancing cartridge which will be described in detail in the ensuing description.

Housing 12 is a somewhat cylindrically shaped body composed of a suitable metallic material such as brass, copper or a suitable alloy thereof, white metal or some other suitable metallic material.

Housing 12 has a threaded exterior surface 30 for acceptance of suitable mounting nuts or other mounting apparatus used to position valve 10 in its final operative position.

Housing 12 has a pair of inlet openings 32 and 34 which open into the internal components of valve 10. Openings 32 and 34 are formed by cylindrical coupling members 38 and 40 which are of such size to be coupled into standard plumbing systems. An exit opening 42 is formed in the lower end of housing 12 by the cylindrically shaped coupling 44 integrally formed in housing 12 (see FIG. 2).

Housing 12 has a lower stepped reduction section formed by cylindraceous section 46 and tapered section 48.

Housing 12 has a round groove 52 formed near top end for receiving a snap ring 50 to be described later. Housing 12 also has a key slot 56 formed in the top thereof to provide indexing for the internal inserts to be subsequently installed in the housing 12.

Figure 2:
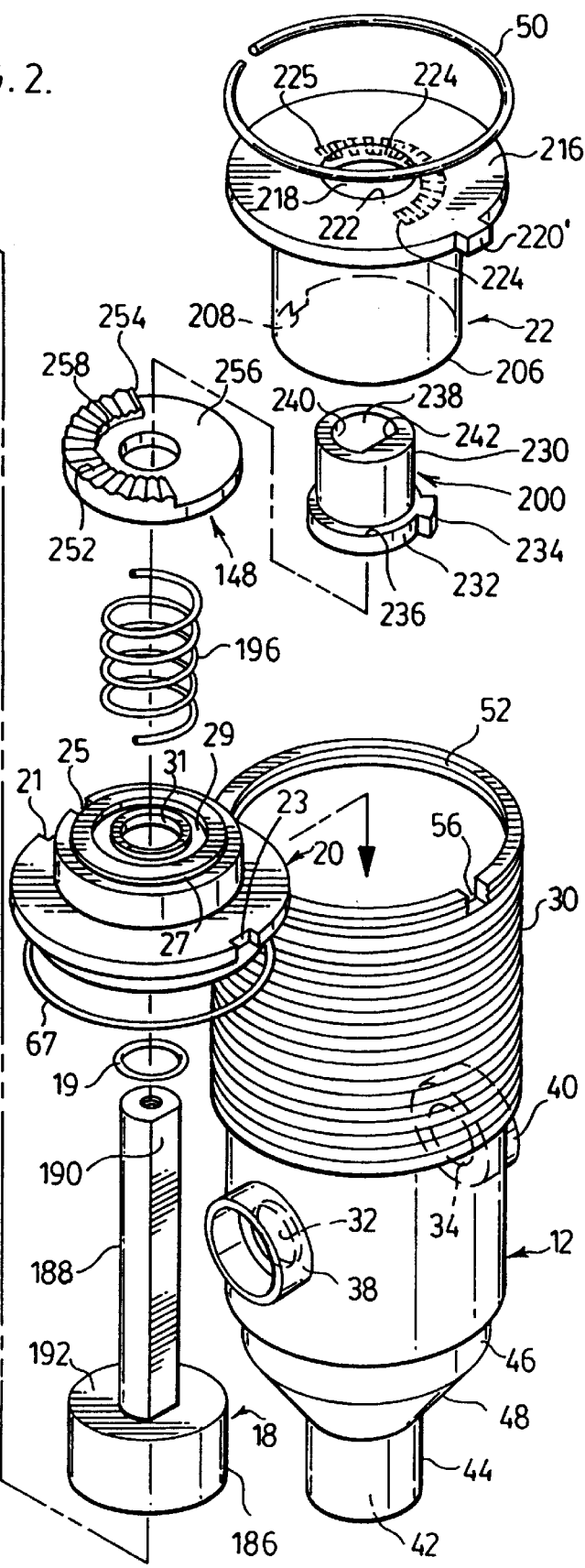
FIG. 2 is an exploded perspective view of the housing and the internal components of the valve of this invention.
Figure 3:
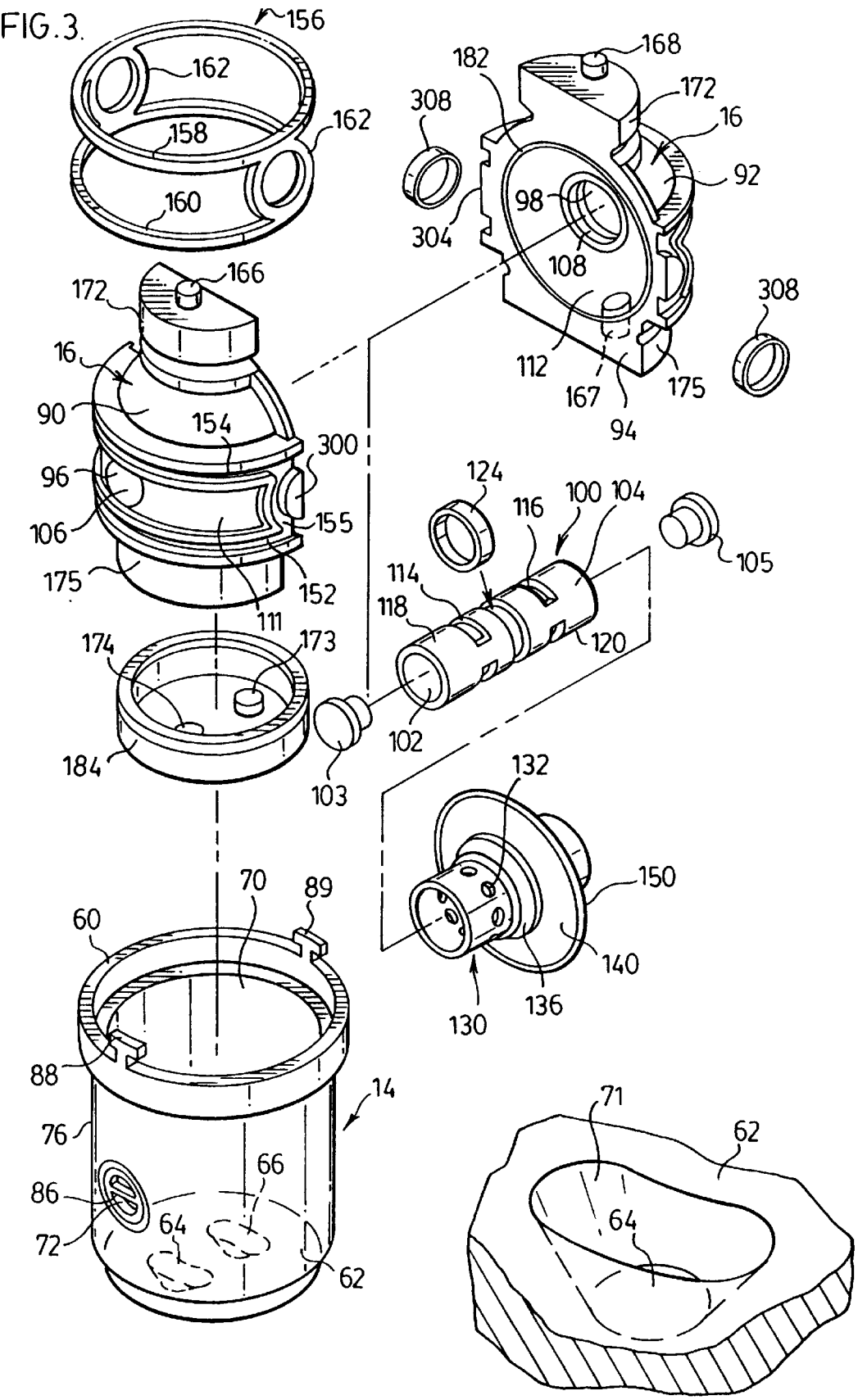
FIG. 3 is an exploded perspective view of the lower insert and the pressure balancing cartridge of the valve of this invention.

Lower insert 14 which ultimately will undergo installation inside housing 12 is shown in FIGS. 2 and 3. Insert 14 is a substantially cylindrically shaped member composed of a high impact plastic material. This material must be suitable for withstanding the usual water pressures and temperatures found in plumbing installations without undergoing distortion, cracking, etc. The lower portion of insert 14 is of a stepped cylindraceous shape to match the lower interior shape of housing 12. A sealing ring 15 is supplied in groove 17 of housing 12 to seal the lower insert in housing 12.

Insert 14 has a large annular upper surface 60 and a lower circular surface 62 (see FIG. 3). Surface 62 is provided with two exit ports 64 and 66 which pass completely through the lower wall 68 and communicate with the internal cavity 70 formed in the interior of insert 14. The exit ports 64 and 66 are shown as having sloping sides 71 and 73 in this description but ports 64 and 66 may take other shapes depending on the particular applications the valve 10 may be specifically tailored to operate.

A pair of inlet ports 72 and 74 are shown located in cylindrical wall 76 of insert 14. These ports allow a communication through wall 76 to the interior cavity 70. Ports 72 and 74 have a shape to accept and capture O rings such as O ring 78 shown in FIG. 2. Port 72 is provided with circular recess 80 to accept grommet 78 in such a fashion that grommet 78 is slightly proud of the recess 80 for sealing against the interior surface of housing 12. The port 72 in wall 76 is provided with a cross bar 86 to prevent collapse of sealing ring 162 into the port such as 72 of insert 14 during operation of valve 10.

Upper surface 60 of insert 14 is provided with a pair of locating tangs 88 and 89 for keying the insert 14 and sleeve cap 20 together in proper orientation in the final assembly of the valve.

FIG. 3 includes the rotatable pressure balancing cartridge 16 shown in its dismantled condition. Cartridge 16 is formed by two somewhat cylindrically shaped half shells 90 and 92. The shells 90 and 92 split at a central plane 94 to yield two identical halves which when suitably mated with the diaphragm 140 (to be described later) and are pressed and held together, form a seal for cartridge 16 at central plane 94.

Cartridge 16 is provided with a pair of inlet ports 96 and 98 in shells 90 and 92 respectively, in which a tubular member 100 is sealingly received. Interior passages 102 and 104 of tubular member 100 are in communication with ports 96 and 98 respectively, of half shells 90 and 92. Tubular member 100 is captured in cylindrical recesses 106 and 108 formed in the interior of walls of shells 90 and 92 respectively. Tubular member 100 is sealed into recesses 106 and 108 by providing a gentle taper to either the mating surfaces of tubular member 104 or recesses 106 and 108 of shells 90 and 92. Tubular member may be fitted with a pair of screens 103 and 105 at input ports 102 and 105 to prevent foreign material from entering the shuttle assembly.

Figure 10:
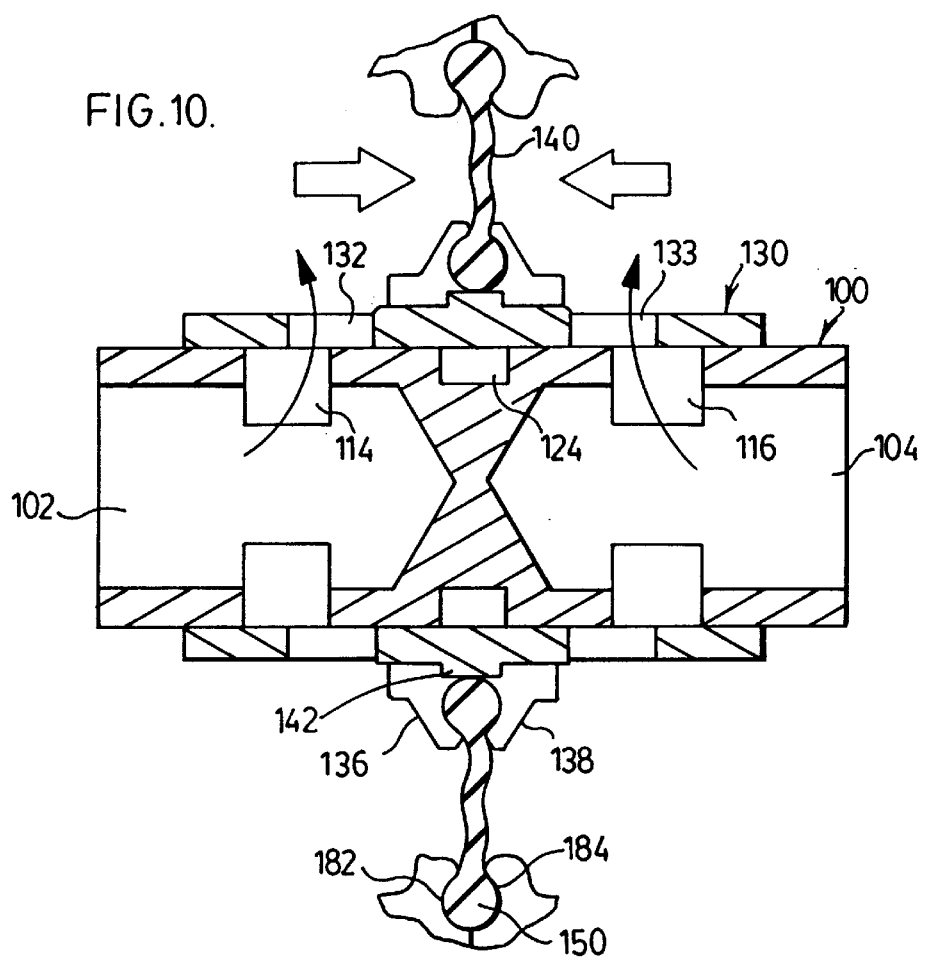
FIG. 10 is a sectional view of the pressure balancing mechanism of the valve of this invention.

Passages 102 and 104 do not pass completely through tubular member 100 but stop short of the center (see FIG. 10). Each of passages 100 and 102 is provided with a plurality of ports 114 and 116 respectively which pass completely through the walls 118 and 120 of tubular member 100 to provide a communication between ports 102 and 104 with the exterior of tubular member 100.

Tubular member 100 is also provided with a central annular groove 122 to accommodate sealing ring 124 (may be neoprene) therein.

A sliding shuttle member 130, of a cylindraceous shape, is slidably mounted on tubular member 100. Shuttle 130 is provided with a series of ports 132 and 133 (133 is shown in FIG. 10) which communicate with ports 114 and 116 in the tubular member 100 respectively.

Shuttle 130 is provided with smooth cylindrical internal and external surfaces. The shuttle 130 provides a smooth external surface on which is damped a pair of pressure rings 136 and 138 (ring 138 not shown in FIG. 3) which capture diaphragm 140 at its internal ring type section 142 surrounding its inner opening. Diaphragm 140 is sealed between the rings 136 and 138 by squeezing the rings 136 and 138 against central section 142 (see FIG. 10 for instance) of diaphragm 140 and deforming the clamping rings 136 and 138 by some suitable means to lock rings 136 and 138 in their operating position on shuttle 130.

Shuttle 130 is installed on tube 104 in a sliding relationship and sealing ring 124 prevents the leakage of water between shuttle 130 and tube 100. (This seal prevents undesired cross flow between the tubular member 100 and the shuttle 130.)

Diaphragm 140 is sealed between shells 90 and 92 during assembly of cartridge 16 so as to divide the internal cavities formed on opposing sides of the diaphragm 140 into two chambers 110 and 112 (110 not shown in FIG. 3). Diaphragm 140 is received in grooves 182 and 184 in shells 90 and 92 respectively and is sealed by the compressive forces placed on the peripheral ring section 150 of diaphragm 140 during assembly of pressure balancing cartridge 16.

The exterior shape of the assembled pressure balancing cartridge 16 is somewhat complex but the mid section tends to be somewhat spherical with a pair of circumferential sealing ring grooves 152 and 154 formed therein for receiving sealing ring member 156. Sealing ring member has a pair of substantially O ring shaped elements 158 and 160 integrally joined by a pair of smaller circular O ring portions 162. Ring member 156 is especially shaped to fit the complimentary groove structure 152, 154, 155 formed in the exterior surface of pressure balancing cartridge 16 within lower insert 14 when the cartridge has been installed in the insert 14 to seal cartridge 16 when installed in lower insert 14.

Shells 90 and 92 are provided with a pair of circular posts 166 and 168 in top surface 171 thereof which provide necessary indexing for the spindle-cup assembly 18 when shells 90 and 92 are assembled into a single unit.

Shells 90 and 92 of cartridge 16 are also provided with a pair of semi-cylindrical surfaces 172 and 175 at the top and bottom of cartridge 16 respectively which when assembled for complete cylindraceous surfaces at the top and bottom of cartridge 16.

A pair of exit ports 173 and 174 are located in the lower cup member 184 which becomes an integral part of cartridge 16. These ports provide a communication between chambers 110 in shell 90 and 112 in shell 92 and exit ports 64 and 66 of insert 14.

A spindle-cup member 18 is provided with a base cup 186 to fit over cylindrical surface 172 of pressure balancing cartridge 16 and engage posts 166 and 168 on the top of cartridge 16 in a predetermined orientation (i.e. post 166 fits into recess 167 of cup 186). The inner surface of base 186 is made of such size as to force shells 90 and 92 together with such force as to seal diaphragm edge 150 between grooves 180 (not shown in FIG. 3) and 182 in shells 90 and 92 respectively. A second compression cup 184 is arranged to fit over cylindrical surface 175 on the lower end of cartridge 16 to provide a corresponding compressive force on the lower end of shells 90 and 92 to seal the diaphragm 140 at the lower end of cartridge 16. Both cups 184 and 186 may be crimped to the mating surfaces on cartridge 16 to ensure sufficient sealing force on the diaphragm ring 150.

Posts 166 and 168 of shells 90 and 92 positively locks the spindle-cup member 18 to the pressure balancing chamber in a predetermined orientation. Spindle-cup member 18 is provided with a cylindrical stem 188 which is also provided with a flat 190. Flat 190 has a predetermined orientation with respect to the orientation of posts 166 and 168 in member 16. Base 186 of spindle-cup member 18 is provided with an upper flat annular surface 192.

A sleeve cap member 20 is provided to fit over spindle 188 of spindle-cup member 18 and rest on surface 192. The sleeve cap member 20 is of a complex shape and is a solid of revolution. Member 20 has a lower annular surface which in the final assembly of valve 10 contacts surface 192 of the spindle-cup member 18 to hold the cartridge firmly in its downward installed position. The sleeve cap member 20 also has a slanting shoulder 65 to wedge sealing ring 67 into engagement with recess 59 of lower insert 14.

Member 20 has a pair of slotted recesses 21 and 23 which engage upstanding tabs 88 and 89 of lower insert 14 to key these components in a predetermined orientation in the final assembly. A third slotted recess 25 is located below annular land 27 of sleeve cap member 20. An annular recess 29 in the top of member 20 provides a seat for spring 196. A sealing ring 19 is provided to seal the top surface 192 of spindle-cup member 18 and the lower surface of sleeve cap member 20. spring 196 rests on top of sleeve cap 20 in annular recess 29. A somewhat disc shaped adjustable stop washer 198 fits on top of spring 196. Stop washer 198 is biased upwardly against a somewhat cylindrically shaped stop coupling member 200.

The components 20, 196, 198 and 200 are designed to be of such dimension as to slidingly fit on shaft 188 of spindle-cup member 18. Member 200, of the above group, is the only member which is forced to rotated with spindle 188.

Upper insert 22 is shown in a perspective elevation view in FIG. 2. Insert 22 is a substantially hollow member having a lower annular surface 206 of the same diameter as land 27 on sleeve cap member 20 so as to cooperatively mate with the land 27 to assure that a constant downward force is exerted on sleeve cap 20. This force is transferred to lower insert 14 by sleeve cap 20. A tang 208 is provided in the lower surface 206 of insert 22 to mate with recess 25 of sleeve cap member 20 so as to key the top insert 22 together with sleeve cap 20 in the final valve assembly.

Member 22 has an interior cylindrical cavity to house spindle 188 and components 196, 198 and 200. The top surface 216 of insert 22 is reasonably flat and is provided with an aperture 218 to allow the spindle 188 of member 18 and its fitted stop coupling member 200 to project therethrough (see FIG. 1). A projecting tab 220 is shown projecting from the top 216 of top insert 20 to engage slot 56 of housing 12.

Structurally member 22 is preferably moulded from a high impact plastic material.

The underside 222 of top 216 of upper insert 20 is provided with an arc of downwardly projecting teeth 224, which partially encircle the aperture 218. One end 225 of the arc of teeth 224 provides an abutment which determines the permanent "off" position of valve 10.

Rotatable stop coupling member 200 fits over shaft 188 of spindle-cup member 18 in a sliding relationship. This member has a pair of stepped cylindrical exterior surfaces 230 and 232 which are separated by a shoulder 236. A projection 234, provided on surface 232, determines the limits to which spindle 188 may be turned (in either direction) in operation of the valve 10. The internal aperture 238 of member 200 is designed to slidably fit over spindle 188 and be keyed thereto.

The aperture 238 in stop coupling member 200 has a cylindrical surface 240 connected to a flat portion 242 which engages flat 190 of spindle 188.

It is the cylindrical surface 230 of member 200 which is made to have a clearance fit with aperture 218 of upper insert 22 and therefore the aperture 218 acts as a guide for the rotatable stop components of valve 10. In operation, the top of stop coupling 200 protrudes through aperture 218 when the valve is assembled. Shoulder 236 rests against lower surface 222 of top 216 of upper is insert 22 when the valve 10 is in its assembled condition.

Adjustable stop washer 198 is provided to enable a tradesman to adjust the upper limit of rotation of spindle 188 (and cartridge 16) to thus limit the maximum flow of hot water allowed to pass through the valve (for the safety of persons using the valve). Projection 234 of stop member 200 engages abutment 225 at the end of the arc of teeth 224 on the lower surface of top 216 of upper insert 22 to define the "off" position (which is not adjustable) for spindle 188 and cartridge 16 of valve 10.

Adjustable stop washer 198 is provided with a cylindraceous aperture 250 which receives spindle 188 in a clearance fit relationship. An arc of teeth 252 on the top surface of washer 198 is provided to mate with teeth 224 on the lower surface 222 of top 216 of upper insert 22. Abutment 254 at the end of the arc of teeth 252 provides the adjustable hot water stop which is ultimately engaged by projection 234 of stop member 200. Surface 256 of member 198 rests against the lower annular surface of stop member 200 and the inner cylindrical surface 258 of the arc of teeth 252 is of slightly larger diameter than cylindrical surface 232 of member 200.

Spring 196, when installed, rests in annular recess 29 of sleeve cap 20 which in turn rests on surface 60 of lower insert 14. The spring 196 biases the adjustable stop washer 198 upwardly so that the arc of teeth 252 are always engaged in arc of teeth 224 of upper insert 22. Rotatable stop coupling member 200 is held captive between adjustable stop washer 198 and the lower surface 222 of upper insert 22 during operation of valve 10. Upper surface 256 of adjustable stop washer 198 pushes against the lower surface of rotatable stop coupling 200. Projection 234 of rotatable stop coupling 200 operates between stops 225 (off) and 254 (maximum hot water flow). Surface 256 of stop washer 198 is displaced from the lower surface 222 of upper insert 22 a sufficient distance to allow projection 234 sufficient clearance to rotate without having undue friction with surfaces 222 and 256.

The maximum arc of rotation available to stop member 200 occurs when teeth 252 and 224 are completely meshed. This would provide an arc of rotation of about 180° for the valve illustrated In FIG. 2.

To adjust the stop washer 198 to limit the rotational travel of spindle 188 to something less than 180° of travel, the portion of stop coupling 200 which protrudes above the top surface of top 216 of upper insert 22 is pushed inwardly into housing 12 so that the bottom surface of stop coupling 200 pushes against surface 256 of adjustable stop washer 198 to frictionally engage washer 198 and displace the washer 198 downwardly to disengage teeth 252 of adjustable stop washer 198 from teeth 224 of upper insert 22. Holding the stop coupling member 200 in the depressed position, the spindle 188 and stop member 200 may be twisted (in this instance in a clockwise direction) and the frictional engagement of the lower surface of stop coupling 200 with the surface 256 of adjustable stop washer 198 causes the stop washer 198 to rotate with stop coupling 200 as long as stop coupling 200 is in the depressed position.

When the desired maximum hot water flow setting is reached, the downward pressure on the protruding portion of stop coupling 200 is removed and spring 196 once again biases adjustable stop washer 198 and stop coupling 200 upwardly until surface 236 of stop coupling 200 engages the lower surface 222 of upper insert 22. Teeth 252 of stop washer 198 again mesh with teeth 224 of upper insert 22 in a new position. Stop 254 of adjustable stop washer 198 has been moved to provide a new location for engagement with projection 234 of stop coupling 200.

The cartridge 16 has been described up to this point in fairly is general terms. Two halves 90 and 92 of cartridge 16 are held together at the top and bottom in compression by cup 184 (see FIG. 3) and base cup member 186 of spindle-cup member 18. A pair of protruding semi cylindrical bosses at the midpoint of the cartridge 16 of which only 300 and 302 shown fully in FIG. 3 form a complete cylinder when the shells 90 and 92 of cartridge 16 are assembled together. The bosses 300 and 302 are held together by a compression ring 308. Similarly, the complimentary bosses on the opposing side of cartridge 16, of which boss 304 is shown, are held together in a similar manner.

In order to assemble cartridge 16, tubular member 100 is first fitted with sealing ring 124 and the shuttle 130 is mounted on tubular member 100 with the diaphragm 140 already clamped on shuttle 130 by rings 136 and 138. The outer ring portion 150 of diaphragm 140 is fitted to its seat 182 and 184 formed in the mating surface of the shells 90 and 92, and the tubular member 100 is aligned with apertures 96 and 98 of shells 90 and 92 and the two shells 90 and 92 are pushed together. Tubular member 100 now seals in ports 96 and 98 and rings 308, and cups 184 (with ports 173 and 174 aligned with passageways 165 and 167 of shells 90 and 92) and 186 (with posts 166 and 168 oriented according to plan) are applied to the assembled shells 90 and 92 to make cartridge 16 a complete entity. The cups 184 and 186 are crimped as shown at 185 and 187 (FIG. 1) respectively to assure the constant application of a compressive sealing force to the top and bottom of shells 90 and 92. Main O ring seal 156 is applied to the assembled cartridge 16.

FIG. 1 shows a partial elevation of the valve in its assembled condition. This view shows particularly the shape of the lower insert 14 wherein the stepped portion 13 is provided with groove 17 which is fitted with a sealing ring 15 to provide a seal between housing 12 and insert 14.

It will also be noted that upper end of lower insert 14 is fitted with a sealing ring 63 in grooves 13 and 15 of housing 12 and lower insert 14 respectively to seal lower insert 14 in housing 12.

Cartridge 16 may now be mounted in lower insert 14 and the cartridge 16—lower insert 14 assembly may be installed in housing 12 with sealing rings 15 and 63 in place as shown in FIG. 1. Next the parts 19, 20, 196, 198 and 200 are slid over stem 188 of spindle-cup member 18 and now upper insert 22 may be installed from the top of housing 12 to mate with sleeve cap member 20 and simultaneously and captivate cartridge 16 between the sleeve cap 20 and lower insert 14. Surface 206 of upper insert 22 rests against the surface 27 of sleeve cap 20 to provide the downward force to position the cartridge 16 in the lower insert 14. Aperture 31 of sleeve cap 20 acts as a guide for the lower portion of spindle 188 to centre the cartridge 16 in lower insert 14.

At this time, spindle 188 and the top 230 of rotatable stop coupling member 200 protrude through aperture 218 of upper insert 22. Projections 88 and 89 on lower insert 14 are mated with recesses 21 and 23 of sleeve cap 20. Projection 208 of upper insert 22 is fitted to recess 25 of sleeve cap 20. Projection 220 of upper insert 22 is mated with slot 56 of housing 12. Wire spring clip 50 is fitted into groove 52 of housing 12 to hold all the components in housing 12 in their cooperating and indexed position. (FIG. 1)

FIG. 4 shows a section of the valve 10 in the closed or off position. In this instance, the ports 32 and 34 are supplied with hot and cold water under pressure. Insert 14 has been installed in housing 12 in its indexed position so that ports 72 and 74 line up with ports 32 and 34. In the closed position, as shown in FIG. 4, the gasket 156 will be located so that the circular portions 162 of gasket 156 completely surround ports 72 and 74 of insert 14 to seal and block any ingress of water from ports 32 and 34 to the passageways 111 and 113 of shells 90 and 92 so that, in this position, the diaphragm 140 is isolated from the water pressure existing at the two water supply ports 32 and 34. At this time, it is impossible for any cross flow of water to occur between the inlets 32 and 34 of valve 10 because of the seal provided by O rings 162 which completely block off the inlet ports 72 and 74. (Most prior art valves require check valves in the balancing mechanism to prevent such flow.)

FIG. 5 shows the same section of the valve with cartridge 16 rotated through a small angle, say 15°, from the closed position. In this position, ports 32 and 34 are now in communication with passage ways 111 and 113 so that passageways 111 and 113 are now pressurized (see water flow arrows). Now water is permitted to flow into ports 96 and 98 of shells 90 and 92 of cartridge 16. Water under pressure will be admitted to the two ends 102 and 104 of tubular member 100 and will exit from ports 114 and 116 of tubular member 100 into ports 132 and 133 of movable shuttle member 130 to pressurize the chambers 110 and 112 located on opposite sides of diaphragm 140. At this time, the opposing chambers 110 and 112 of cartridge 16 are pressurized but because ports 173 and 174 are not aligned with ports 62 and 64 of lower insert 14, no water may flow from valve 10.

At this time, the diaphragm 140 is subjected to the pressures existing in chambers 110 and 112 and its position will thus be determined by the pressures existing at inlet ports 32 and 34 at the water supply inlets.

Figure 6:
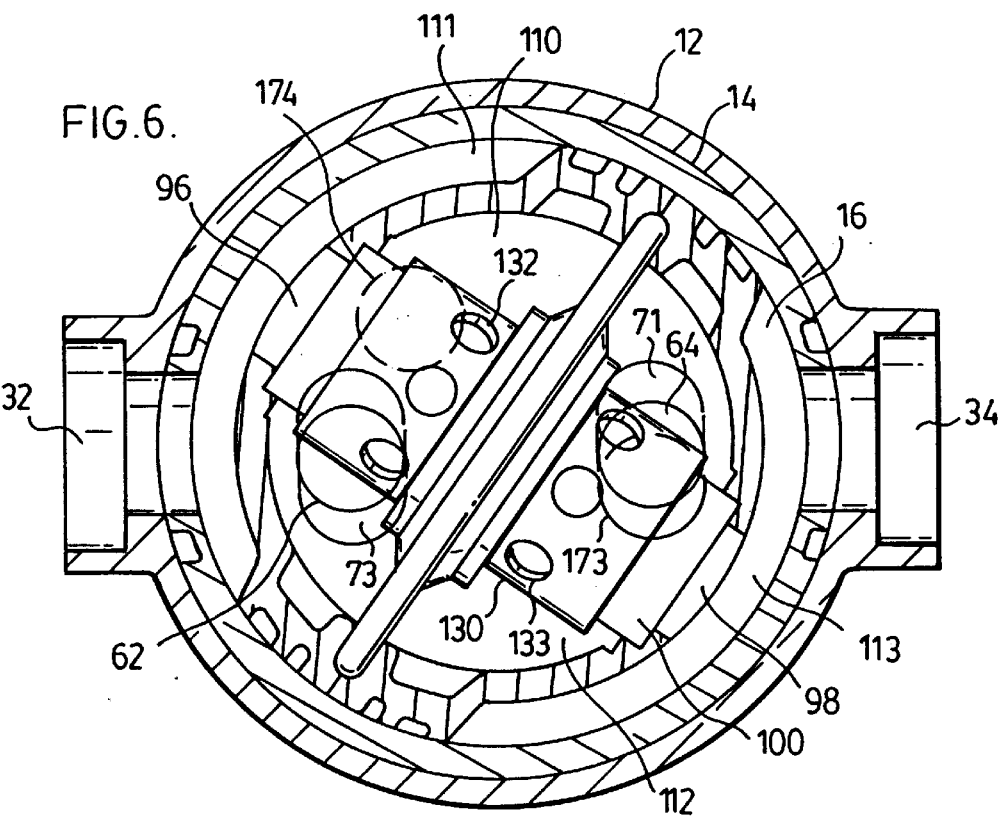
FIG. 6 is a cross sectional view of the valve of this invention shown with the cartridge rotated through an angle of about 60° from the position shown in FIG. 4.

FIG. 6 shows the cartridge 16 rotated about 60° from the off position as shown in FIG. 4. At this time, ports 173 and 64 of cartridge 16 and lower insert 14 are shown in almost complete alignment and cold water (near maximum) flows from port 34 into passageway 113, into port 98 into tubular member 100, out port 116 of tubular member 100 into port 133 of sliding shuttle 130 and into chamber 112 of cartridge 16, and thence out of passageway 167 and through exit port 173 of cartridge 16 to exit port 64 of lower insert 14 into mixing chamber 75 (see FIG. 1) in housing 12, and through exit port 42 of valve 10. FIG. 3 (insert) shows the shape of port 64 in enlargement. The ports 64 and 66 are somewhat relieved to form funnel shaped openings in the surface 62 of lower insert 14 to allow waterflow to begin to flow gradually as port 173 begins to be gradually exposed to port 64. This feature reduces emitted valve noise and reduces water hammer effects caused by sudden pressure fluctuations in the water supply stream such as occur when a water supply is suddenly turned on or off.

Figure 7:
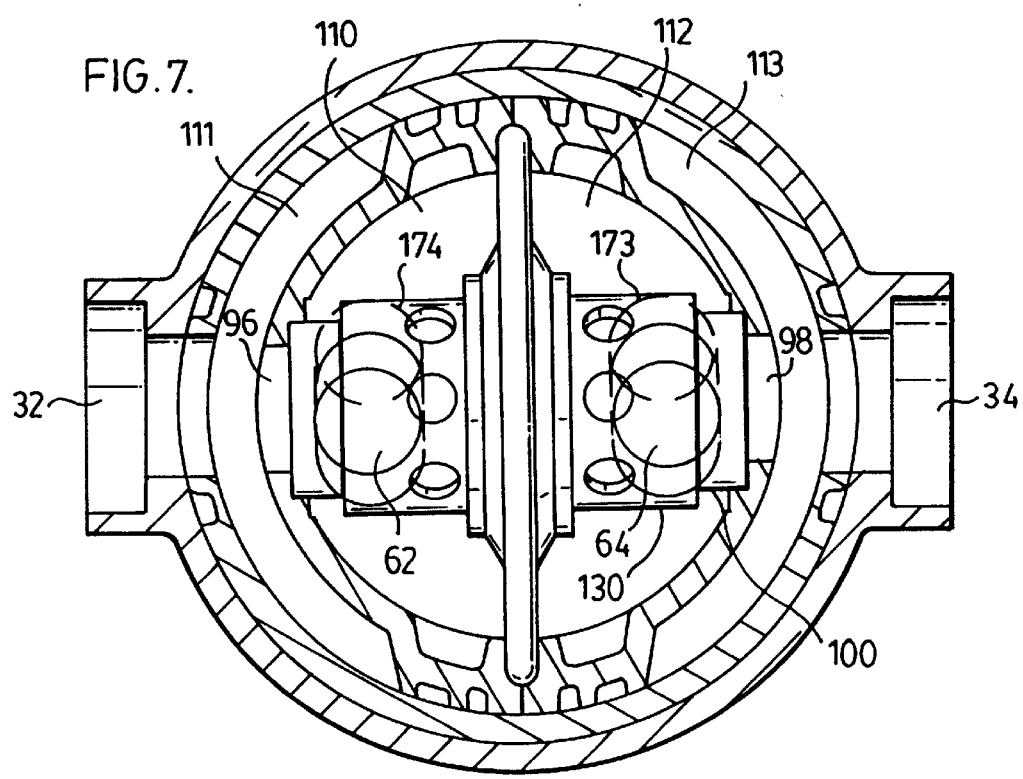
FIG. 7 is a cross sectional view of the valve of this invention shown with the cartridge rotated through an angle of about 90° from the position shown in FIG. 4.

FIG. 7 shows cartridge 16 rotated about 90° from the closed or off position of FIG. 4. In this position, the ports 173 and 174 of cartridge 16 are in partial alignment with ports 64 and 62 of lower insert 14. In this instance, water flows from port 34 through passageway 113 into port 98, into port 104 of tubular member 100, out of tubular member 100, through port 116, through port 133 of sliding shuttle 130, and out of partially aligned ports 173 and 64 to mixing chamber 75 of valve 10.

Simultaneously, hot water from port 32 flows into passageway 111 into port 96 of cartridge 16 into tubular member 100 (passageway 102) out of port 114 of member 110 into port 132 of sliding shuttle 130 and into chamber 110 of cartridge 16. At this time, the water pressures existing in the chambers 110 and 112 are exerted on the diaphragm 140 to establish its equilibrium position.

Water flows out of chamber 110 via the passageway 165 in shell 90 into the partially aligned exit ports 62 and 174, into mixing chamber 75 of valve 10. The hot water exiting from exit port 62 is mixed with the cold water exiting from exit port 64 of lower insert 14 to provide a warm water stream exiting from port 42 of valve 10. At this setting of the valve 10, the water mix will be approximately 50:50 hot and cold water (depending on pressures existing at the hot and cold water inlets).

Figure 8:
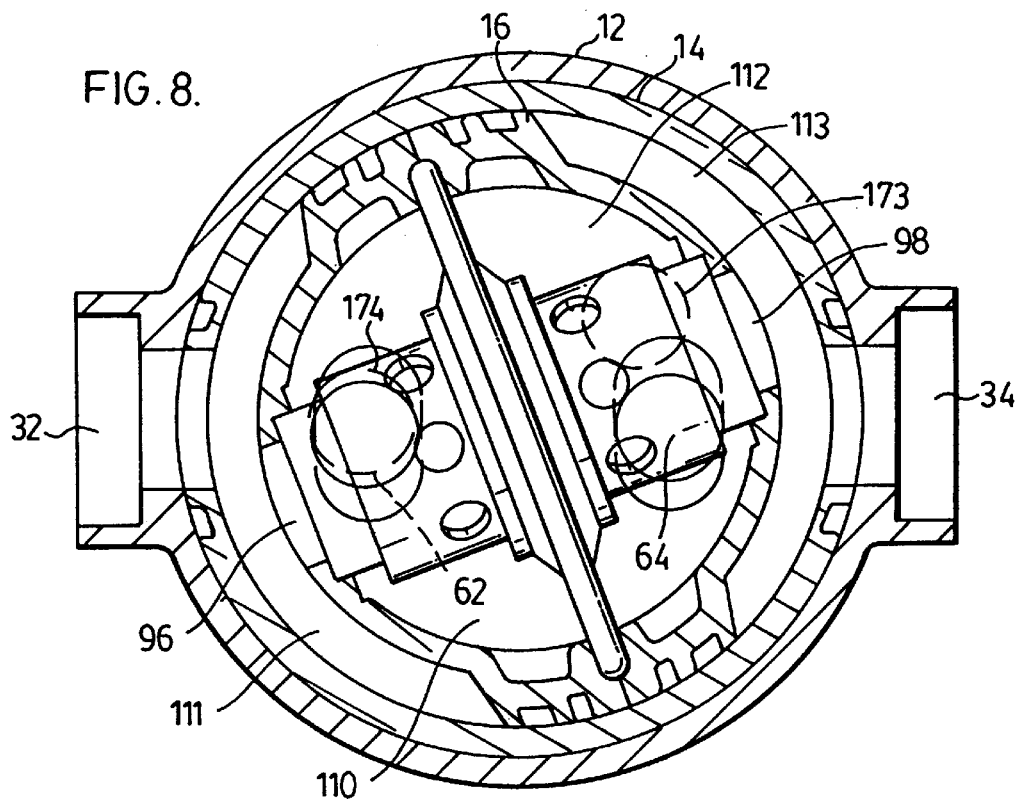
FIG. 8 is a cross sectional view of the valve of this invention shown with the cartridge rotated through an angle of about 110° from the position shown in FIG. 4.

FIG. 8 shows the cartridge position when the cartridge has been rotated through about 110° from the off position shown in FIG. 4. In this instance, the ports 173 and 64 are only partially aligned thus the cold water egress from chamber 112 is somewhat throttled. The hot water exit ports 174 and 62 are almost in complete alignment, thus the hot water flow from. chamber 110 is almost at the maximum.

Figure 9:
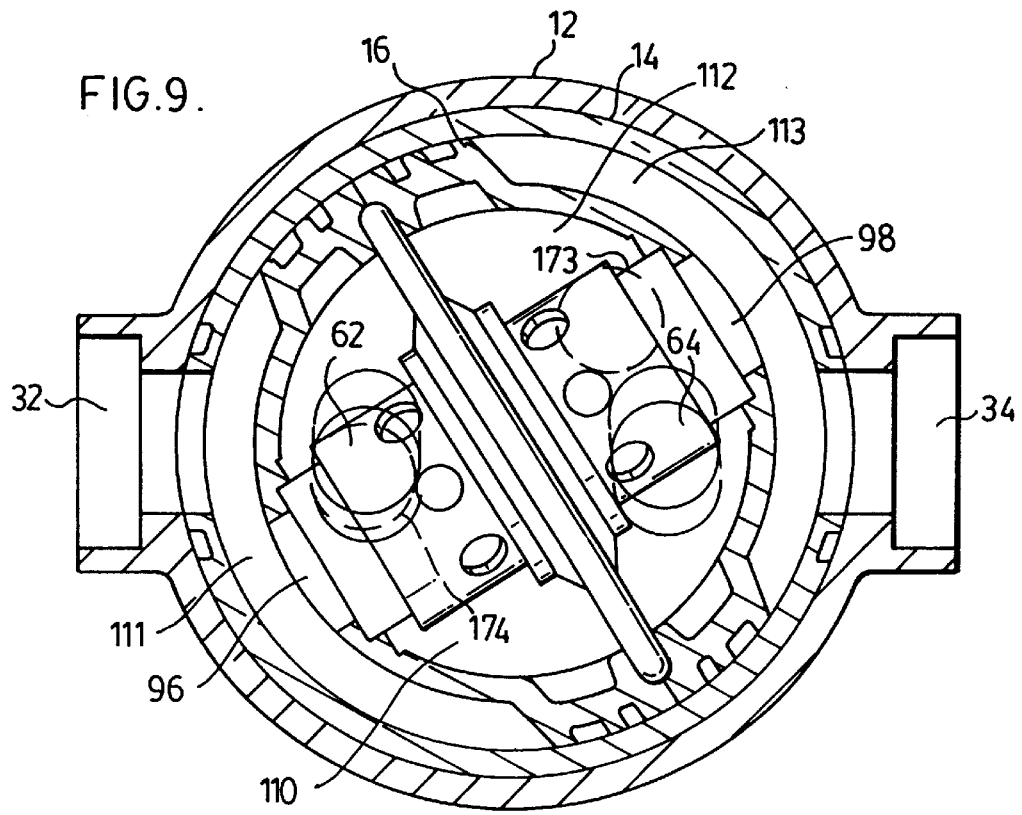
FIG. 9 is a cross sectional view of the valve of this invention shown with the cartridge rotated through an angle of about 120° from the position shown in FIG. 4.

FIG. 9 shows the position of cartridge 16 for maximum hot water out flow from valve 10. In this instance, the cold water exit ports 173 and 64 are completely misaligned yielding no cold water flow through cartridge 16. However, the hot water exit ports 174 and 62 are almost completely aligned, thus allowing only hot water to flow into mixing chamber 75 of valve 10.

FIG. 10 shows the position of shuttle 130 under conditions of equal pressurization existing at the hot and cold water supplies. In this situation, the diaphragm remains at the center position of cartridge 16 allowing equal flow in ports 116–133 and is ports 114–132.

Figure 11:
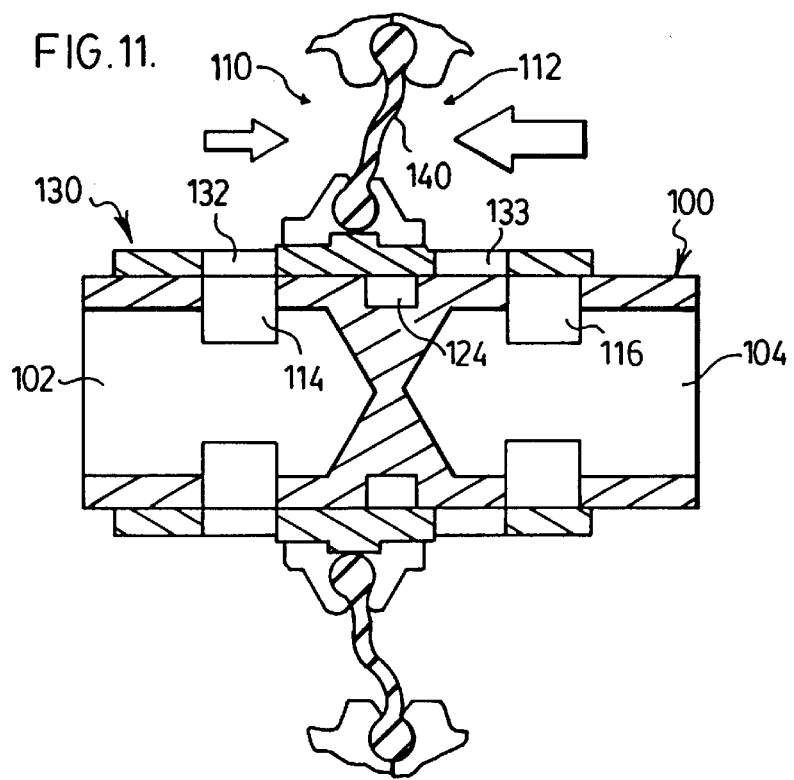
FIG. 11 is a cross sectional view of the pressure balancing mechanism of the valve of this invention in an "unbalanced" position.

FIG. 11 shows the position of shuttle 130 when there is a difference in pressure between the input supplies. In this instance, the pressure on input 104 of tubular member 100 is shown as being somewhat greater than the pressure existing at port 102 of tubular member 100. Pressure causes water to flow through ports 104, 116, 133 to pressurize chamber 112 and diaphragm 140. Because the pressure at port 102 is less than the pressure existing at port 104 of tubular member 100, the water flow through ports 114–132 cannot pressurize the chamber 110 and diaphragm 140 with the same force as the water entering chamber 112. As a result, the pressure unbalance on the diaphragm 140 causes the diaphragm 140 to move the shuttle 130 to the left. This restricts the water flow through ports 116 and 133 and simultaneously the ports 114–132 open wider thus increasing the flow of water to chamber 110 to restore the balance of flow to the two output ports 64 and 66.

It is an important feature that this valve will operate in any position; the shuttle is restrained from "falling" to one of the extreme travel positions by the diaphragm if the axis of shuttle 130 should be mounted in other than a horizontal plane. Most prior art valves must be mounted with the shuttle axis in a horizontal plane.

Because the internal chambers 110 and 112 are "prepressurized" before the exit orifices are aligned, the diaphragm and shuttle are moved to a pressure balanced condition prior to any water leaving the valve.

Because of the peculiar construction of this valve, waterflow through the valve generally kept away from the stem end of the valve. Because most prior art pressure balancing chambers remain stationary when the valve is in operation, the valve stem is usually employed to rotate an orifice plate which is necessarily connected to the valve stem (for the selection of water temperature at the output). Some method of sealing the valve stem against the constant pressure exerted by the water must be found, and in time leakage at the stem generally occurs.

Most prior art valves are designed so that the pressure balancing chambers which are always in communication with the pressurized water supplies. This causes continuous stress on the shuttle mechanism and other valve components (including the valve stem) which causes many prior art valves to be prone to leakage. Some prior art valves require a system of check valves in their construction to prevent "sneak" flow between the hot to cold pressurized chambers (and vice versa) which may cause cross water flow in a plumbing system if the check valves leak. Applicant's valve is not subject to such unwanted flow.

Lastly because the main seal 156 of the cartridge sweeps through an angle of between 90–120° during operation of this balancing valve, this means that the hottest water from the hot water inlet port is not continuously exposed to the same portion of the seal 156 during operation of valve 10. This tends to reduce the deterioration of seal 156 because the effects of hot water exposure are spread out over different areas of seal 156 during operation of valve 10. Most prior art valves continuously expose the hot water seals in the valve assembly to the hottest water during operation. This tends to shorten seal life.

While changes and alterations of applicant's invention will be apparent to those skilled in the art, applicant prefers to limit the scope of the invention by the coverage provided by the appended claims.

What is claimed is:

1. A pressure balancing water valve comprising a housing having a pair of inlet coupling devices mounted thereon, said inlet coupling devices being connected to sources of hot and cold pressurized water, said inlet coupling devices being in communication with a pair of ports formed in said housing at first and second predetermined locations in said housing, said housing having an outlet coupling device which is in communication with a mixing chamber formed in said housing, a rotatable cartridge mounted in said housing for rotation therein, said cartridge having a pair of inlet cartridge ports and a pair of outlet cartridge ports, said cartridge having a pair of pressure chambers formed therein on opposing sides of a pressure balancing diaphragm assembly, each of said inlet cartridge ports being selectively connectable to one of said inlet ports of said housing upon rotation of said cartridge within said housing to pressurize said cartridge chambers to an "on" position, and each of said inlet cartridge ports being blocked from communication with each of said inlet ports in said housing upon rotation of said cartridge to an "off" position to depressurize said cartridge chambers wherein said cartridge is comprised of a pair of substantially identical half shells having a pair of suitable mating surfaces which sealingly engage a pressure diaphragm at is periphery to form a pair of cartridge chambers on opposing sides of said diaphragm in each shell, a pressure balancing valve assembly comprising the diaphragm, a tubular member, and a sliding sleeve mounted on said tubular member, said tubular member having cylindrical outer surface and having a pair of cylindraceous cavities formed in each end thereof, such that each cavity is in communication with a cartridge inlet port, each cavity having at least one opening at a predetermined location in each cavity passing from said cavity to said outer surface, said sliding sleeve mounted on said tubular member having an inner cylindraceous surface for mating with said tubular member, sealing means on said tubular member between the cavity openings to prevent water flow between said sleeve and said tubular member, said sliding sleeve having at least one pair of openings located in predetermined locations on said sleeve to cooperate with said openings in each cavity in said tubular member to provide a predetermined flow relationship into said chambers, in accordance with the pressures existing in each chamber, said diaphragm having a central aperture formed therein for receiving said sliding sleeve sealingly therein.

2. A valve assembly as claimed in claim 1 wherein said pressure balancing valve assembly provides water flow into said chambers in an inverse ratio to the pressures existing in said chambers.

3. A valve assembly as claimed in claim 1 wherein each cartridge chamber outlet port cooperates with a stationary mixing chamber inlet port to control the flow of water from said cartridge chambers to said mixing chambers in accordance with a predetermined formula.

4. A water pressure balancing device for restoring the flow of water therethrough in the presence of pressure disturbances occurring in the system feeding said device, said device having a hot water inlet port, a cold water inlet port, a tubular shaped member having a cylindraceous outer surface and having a pair of opposing hollow cavities formed therein separated by a solid central section in said tubular member, said solid central section having a groove formed in the exterior surface thereof for receiving a sealing ring, each cavity formed therein being in communication with one of said inlet ports, each cavity having at least one aperture of predetermined shape formed therein in a predetermined location extending from said cavity to the external surface of said tubular shaped member, a sleeve mounted on said tubular member in a sliding relationship, said sleeve member having a pair of opposing ports formed therein which cooperate with said apertures in said tubular member to control the flow of water from said cavities into said opposing ports, said sleeve being slidably moved by pressure imbalances existing in the system so as to restrict the flow of pressurized water from whichever cavity is subjected to a pressure increase and vice versa.

5. A water pressure balancing device as claimed in claim 4 wherein said water pressure member is a diaphragm mounted on said sleeve in a sealing relationship, wherein said diaphragm is subjected to water pressures existing at said hot and cold water inlet ports.

* * * * *